Jan. 21, 1969   L. J. MURRAY   3,422,998
POUR SPOUT ADAPTER
Filed March 11, 1968

INVENTOR.
LEONARD J. MURRAY
BY *Daniel J. Szura*
ATTORNEY

United States Patent Office 3,422,998
Patented Jan. 21, 1969

3,422,998
POUR SPOUT ADAPTER
Leonard J. Murray, 11634 Ashton, Detroit, Mich. 48228
Filed Mar. 11, 1968, Ser. No. 712,261
U.S. Cl. 222—567   8 Claims
Int. Cl. B65d 25/48

ABSTRACT OF THE DISCLOSURE

A pour spout adapter for containers is described. The adapter has a cylindrical body into which a pour spout can be inserted. The cylindrical body has a lip or flange at one end and a series of flexible circumferential ribs of gradually decreasing diameter spaced below the lip. The lip acts as a gasket and stop; the ribs make the adapter easy to insert into a container—they also serve to seal the container and allow the adapter to fit the container openings of varying size.

The combination of the adapter and a pour spout is also described.

Background of the invention

Dispensing liquids from containers is more conveniently accomplished by using a pour spout which fits into the container opening. It is common when dispensing alcoholic beverages such as bourbon, scotch, wines, and the like, to insert the pour spout into a cork of proper size to fit the bottle opening. Using a cork to serve as an adapter for the pour spout has a number of disadvantages. First of all, corks of various sizes must be available in order to fit the various size bottle openings. Secondly, because corks generally have a smooth outer surface and are relatively non-resilient, they do not fit and hold tightly in the bottle opening. Third, since corks ordinarily have no lip or other protrusion to serve as a stop, the cork adapter may be forced too far into the bottle opening. Fourth, corks tend to absorb the alcoholic beverages they contact. This absorbed material may promote undesirable mold growth, and the like. Finally, corks tend to chip and crack readily and thus may contaminate the contents of the container. In summary, corks as pour spout adapters (a) are not adaptable to bottle openings of varying and non-uniform size, (b) do not fit properly and hold tightly in the bottle opening, and (c) tend to be contaminated by, or tend to contaminate, the liquid contents of the bottle they are inserted in.

The present invention provides a pour spout adapter which overcomes these disadvantages. The present adapter fits and holds tightly in the bottle opening; it adapts itself to bottle openings of various sizes and varying uniformity; being of non-cork material, the present adapter does not tend to contaminate the alcoholic beverage, and the like, it contacts. Furthermore, the present adapter has a lip or flange at one end which protects the bottle edge and acts as a stop when the adapter is fully inserted into the bottle opening.

Summary of the invention

A pour spout adapter for containers which comprises a cylindrical body having an opening of substantially uniform diameter through its entire length, said body having (1) a circumferential flange or lip at one end extending at right angles from said body, and (2) a series of circumferential ribs below said flange, said ribs extending outwardly and upwardly toward the flange, with the rib nearest said flange having a diameter substantially equal to the flange diameter, the remaining ribs having progressively smaller diameters.

Brief description of the drawings

Embodiments of the present invention are shown in the drawings in FIGURES 1, 2, 3 and 4. These drawings illustrate but do not necessarily limit the scope of the invention. The same numbers are used to designate the same parts as they occur in each of the figures.

Description of the preferred embodiments

An embodiment of this invention is a pour spout adapter for containers which comprises (a) a cylindrical body having an opening of substantially uniform inside diameter extending the entire length of said body, (b) said body having a circumferential flange extending outwardly from said body, said flange having two substantially parallel faces, the upper face of which is flush with one end of said body, (c) said body having below said flange a plurality of axially spaced circumferential ribs, said ribs being bound by two faces, each of said faces extending upwardly toward said flange and each making an angle with a plane perpendicular to the axis of said body, of at least about 20°, said rib located nearest said flange having an outside diameter substantially equal to the diameter of said flange, with the remaining ribs each having a diameter progressively smaller as they are spaced further from said flange. Another preferred embodiment is the adapter described above having four circumferential ribs. Other embodiments are the adapters described above being of a one piece construction and preferably made of a flexible easily molded material such as polyethylene, polyurethane, and the like. A feature of the adapter is that it is easily inserted into a container opening. When inserted, it seals tightly and is surprisingly resistant to loosening or being readily pulled out of the container opening. Because the ribs are of progressively decreasing diameter, the adapter fits containers of various and varying opening size. Still another feature of the adapter is that the flange at one end prevents the adapter from being inserted too deeply into a container opening. Although useful in containers of various sizes, types, and made of any suitable material, this adapter is especially useful in glass bottles used for holding alcoholic beverages such as wines, rye, bourbon, scotch, and the like. With bottles made of glass, the flange on the adapter serves to protect the edge of the glass bottle from being chipped or damaged when the adapter/pour spout combination is inserted fully into the bottle opening. This is particularly true when the pour spout is made of metal.

Figure 1:
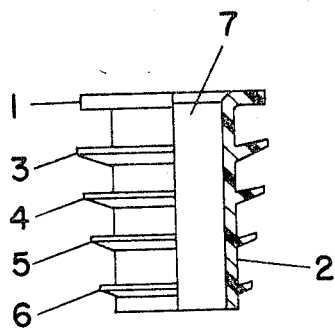
FIGURE 1 is a combination side elevation and section view of an adapter.

Referring to FIGURE 1, this illustrates an embodiment of the adapter itself. The flange 1 is flush with the end of the cylindrical body 2 and it extends outwardly at right angles to the body axis. The opening 7 in the cylindrical body 2 is substantially uniform in diameter and extends the length of the body 2. This opening 7 can be of any size convenient to receiving a pour spout. The circumferential ribs 3–6 extend outwardly from the body 2 below the flange 1. These ribs 3–6 form an acute angle with a plane perpendicular to said body 2. This angle is preferably no less than about 20° and no greater than about 30°. These ribs 3, 4, 5, 6 extend upwardly toward the flange 1. The outside diameter of the rib 3 nearest the flange 1 is substantially equal to the diameter of flange 1. By substantially equal, I mean that the diameter of the rib 3 can be slightly larger, slightly smaller, or equal to the diameter of flange 1. The diameter of the remaining ribs 4, 5, 6 is progressively smaller as these ribs 4–6 are placed further from said flange 1. It is important that the ribs 3, 4, 5, 6 extend at angle upwards toward the flange 1. By extending upwards as they do, the ribs 3, 4, 5, 6 allow the adapter to be easily inserted into a container opening. These ribs 3, 4, 5, 6 tend to urge the adapter into the bottle opening. After the adapter is inserted, the ribs 3, 4, 5, 6 prevent the adapter from loosening and offers resistance to having the adapter pulled out of the container opening. By offering this resistance to being pulled out or of loosening, there is less chance of the pour spout and adapter being knocked out of the container or of falling out of the container when the container is tipped to dispense a liquid from it.

Although the adapter of FIGURE 1 has only four circumferential ribs 3, 4, 5, 6, this is only meant to illustrate and not to critically limit the maximum number of such ribs. However, the adapter must have at least two such ribs.

Figure 2:
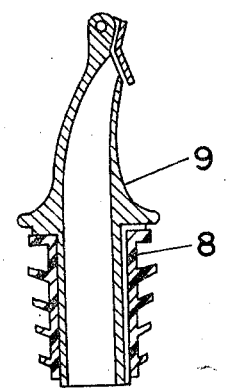
FIGURE 2 is a longitudinal section view of the combination of an adapter of the present invention and a common type of pour spout.

FIGURE 2 shows the adapter 8 of FIGURE 1 in combination with a pour spout 9. The pour spout 9 is of conventional design and made of metal. However, a pour spout of any suitable design and of any suitable material can be used provided it fits tightly in the adapter 8.

Figure 3:
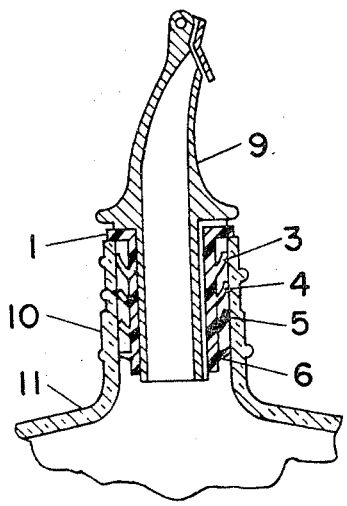
FIGURE 3 is a longitudinal section view of an adapter and pour spout combination fully inserted into a bottle opening.

FIGURE 3 shows the adapter 8/pour spout 9 combination of FIGURE 2 positioned in the neck 10 of a bottle 11. The figure shows how the ribs 3, 4, 5, 6 distend upwards and resist withdrawal and/or loosening of the adapter 8/pour spout 9 combination from the neck 10. FIGURE 3 also shows how the flange 1 on the adapter acts to prevent the adapter 8 from being inserted too far into the neck 10. The flange 1 also acts as a gasket between the pour spout 9 and the neck 10. Thus, flange 1 protects the neck 10 from being chipped, cracked or damaged if the pour spout 9 were forcefully inserted into the neck 12.

FIGURE 4 again shows the adapter/pour spout positioned in the neck 12 of a bottle 13 so that only ribs 5, 6 are inside the neck 12. This shows that the adapter need not be inserted its entire length into the neck of bottle in order to be effective.

Figure 4:
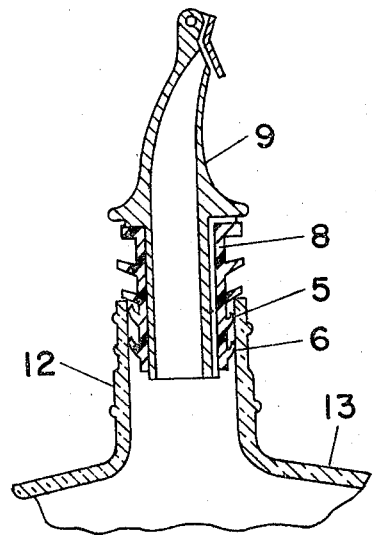
FIGURE 4 is a longitudinal section view of an adapter and pour spout combination partially inserted in a bottle opening.

It is also apparent from FIGURE 4 that if only one rib, rib 6, were inserted into the neck of the bottle, the adapter/pour spout combination could not maintain an upright position as when two ribs are in the bottle neck. The adapter with only one rib would not be resistant to being dislodged from or loosened in the neck. Thus, it is clear that the adapter of the present invention must have at least two circumferential ribs of progessively smaller diameter. However, the maximum number of ribs the adapter may have is not critical. The adapter shown in FIGURES 1–4 has four ribs. The adapter of this invention can have 5, 6, 7 or more ribs, if desired. Where the adapter has more than about six ribs, it may make the adapter more difficult to remove from the container opening.

The neck of the bottle in FIGURES 3 and 4 is shown to be made of glass and to have a threaded outside surface. The pour spout adapter of the present invention can be used equally well in bottles having a neck with a smooth outside surface. The bottle likewise can be made of any suitable material other than glass.

The adapter of the present invention may be made of any material which is suitably flexible and sufficiently resistant to attack by liquids, especially alcohol and alcoholic beverages. Adapters can be made of elastomers and resins such as cis-polybutadiene, natural rubber, neoprene, isoprene-isobutylene copolymer, ethylene/propylene/diene terpolymer, polyurethane and polytetrafluoroethylene. Especially useful materials are the thermoplastic polymers such as polyethylene, polypropylene, and the like.

The adapter has been shown in the figures in combination with a metal pour spout of a common design. It is understood, however, that a pour spout of any suitable design and made of any suitable material may be used with the adapter of the present invention.

Having fully described the pour spout adapter of the present invention, it is to be limited only within the spirit and lawful scope of the claims presented below.

What is claimed is:

1. A pour spout adapter for containers which comprises:
 (A) a cylindrical body,
 (B) having an opening of substantially uniform inside diameter extending the entire length of said body,
 (C) said body having a circumferential flange extending outwardly from said body, said flange having two substantially parallel faces, the upper flange face being flush with the end of said body,
 (D) said body having beneath said flange a plurality of axially spaced circumferential ribs extending outwardly from said body, said ribs being bound by two faces, each of said rib faces extending upwardly toward said flange, and making an acute angle with a plane perpendicular to the axis of said body, said rib located nearest said flange having an outside diameter substantially equal to the diameter of said flange with the remaining ribs each having a diameter progessively smaller as it is spaced further from said flange.

2. The adapter of claim 1 having four of said circumferential ribs, each of said ribs being spaced at substantially equal distances one from another along the length of said body, with the rib furtherest from said flange being substantially above the nearest end of said body.

3. The adapter of claim 1 wherein the construction is one piece and the construction material is selected from the group consisting of polyethylene, polypropylene, polytetrafluoroethylene and polyurethane.

4. The adapter of claim 2 wherein the construction is one piece and the construction material is a thermoplastic.

5. The adapter of claim 4 wherein said construction material is polyethylene.

6. In combination, a pour spout and the adapter of claim 1.

7. In combination, a pour spout and the adapter of claim 2.

8. In combination, a metal pour spout and the adapter of claim 5.

References Cited

UNITED STATES PATENTS

| | | | |
|---|---|---|---|
| 2,636,629 | 4/1953 | Livingstone | 215—73 |
| 3,104,786 | 9/1963 | Sanchis | 222—481 |

FOREIGN PATENTS

| | | |
|---|---|---|
| 202,021 | 2/1959 | Austria. |
| 839,907 | 5/1952 | Germany. |
| 653,023 | 5/1951 | Great Britain. |
| 821,770 | 2/1957 | Great Britain. |

ROBERT B. REEVES, *Primary Examiner.*
H. S. LANE, *Assistant Examiner.*

U.S. Cl. X.R.

222—481, 563